United States Patent Office 3,408,763
Patented Nov. 5, 1968

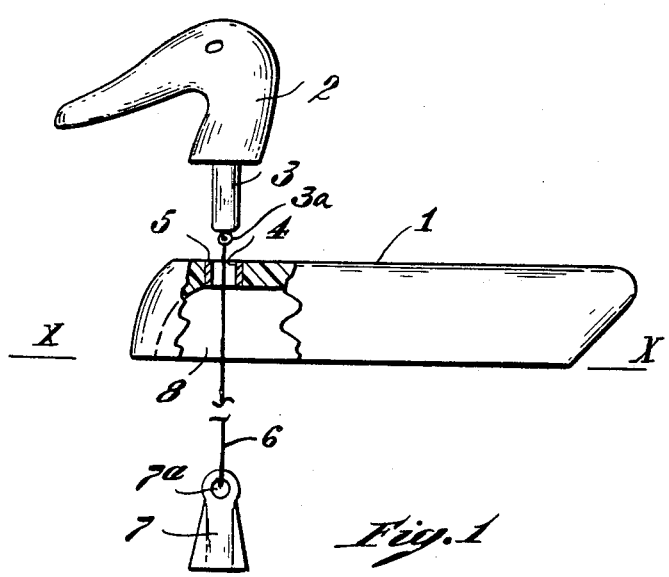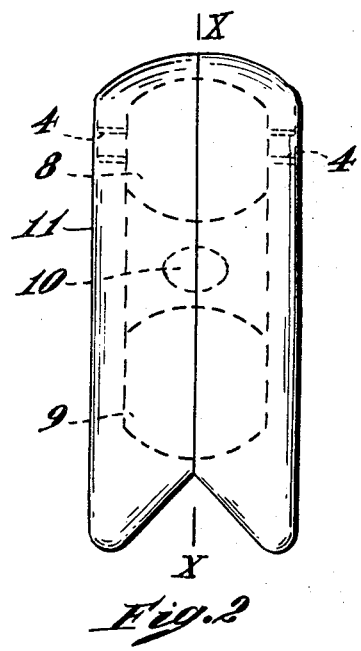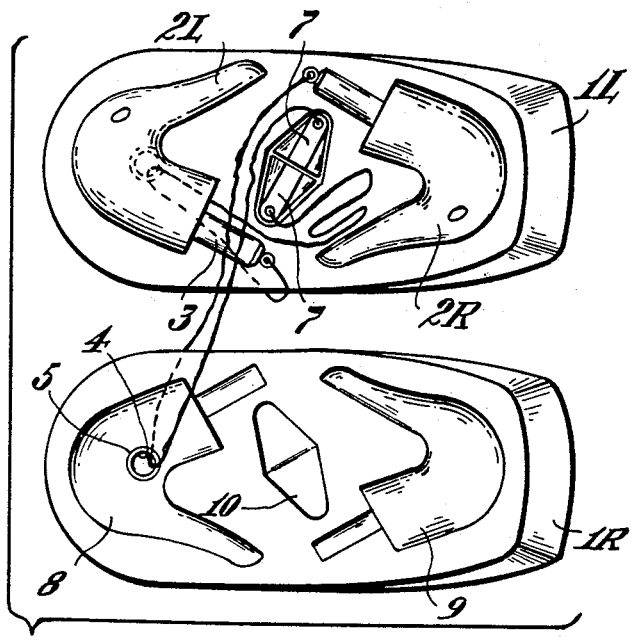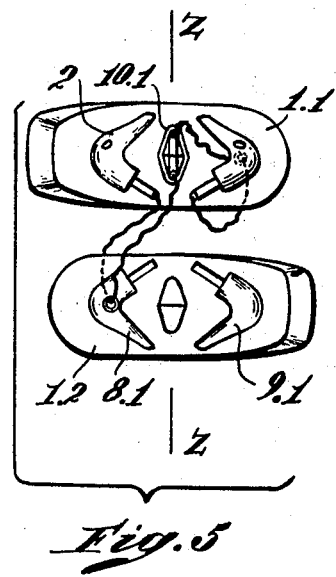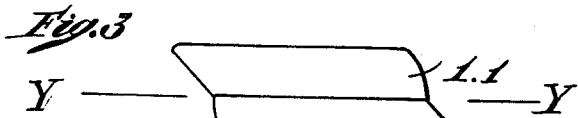
INVENTOR.
Leroy C. Rudolph
BY Roberts, Cushman & Grover
ATT'YS.

3,408,763
TWIN DECOYS
Leroy C. Rudolph, Chico, Calif., assignor of one-half to Edmond C. Johnson, Chico, Calif.
Filed Oct. 22, 1965, Ser. No. 500,679
3 Claims. (Cl. 43—3)

ABSTRACT OF THE DISCLOSURE

Decoys having removable heads are provided with recesses in each of two body portions to partly receive the heads of two decoys. During storage and transport, the heads lie between the recesses of the two bodies.

---

The field of this invention relates to animal decoys such as are commonly used by hunters or photographers to attract animals within shooting or photographing range.

Frequently, decoys must be transported to remote regions and they must often be transported by hand or within restricted stowing space. Accordingly, decoys should be neither heavy nor bulky, and because they often receive rough treatment, they should not be fragile. Prior attempts to overcome these obstacles, especially in the case of duck decoys, have resulted in decoys which have detachable heads and body cavities in which the heads can be placed. But these decoys have necessitated devices of varying complexity to keep the decoy head securely in place either in the body cavity or in its natural position. As a consequence, these decoys have also been expensive. Moreover, they cannot be quickly set up in the field and thus waste time preferably spent in hunting and photographing.

Objects of the present invention are to provide a decoy which is portable, lightweight, durable, easily and quickly set-up in the field, less bulky than previous decoys, and inexpensively constructed of comparatively simple parts.

The substance of various aspects of the invention can be briefly summarized as concerning an animal decoy which comprises a reproduction of the animal body without head with two recesses each approximating the contour of the animal's head and each shallower than the thickness of the head. The recesses are shaped in such a fashion that at least one head of a decoy can be placed into a respective recess and two similar decoys placed within respective recesses facing each other and retaining the head. In another aspect, the invention resides in a pair of animal decoys each constituting one fully separable half of a twin decoy and each comprising a reproduction of the animal head and a reproduction of the animal body having two recesses each approximating the contour of said heads and each shallower than the thickness of the heads, whereby the heads of the decoys can be partly placed in corresponding recesses of respective bodies for transport or storage with the recesses facing each other and retaining the heads.

For the purpose of illustration, typical embodiments of the invention are shown in the accompanying drawing in which FIG. 1 is a side view of a single decoy;

FIG. 2 is a side view of a twin decoy mated for transport or storage;

FIG. 3 is a view of the twin decoy of FIG. 2 opened at plane X—X of FIG. 2;

FIG. 4 is a side view of a modified twin decoy mated for transport or storage; and FIG. 5 is a view of the twin decoy of FIG. 4, similar to FIG. 3, opened at plane Y—Y of FIG. 4.

In the particular embodiment of the invention chosen for the purpose of illustration, the single decoy (FIG. 1) comprises a body portion 1 and a detachable head portion 2 which are reproductions of the animal body and head, respectively. Each reproduction must simulate the animal, such as the duck illustrated here, sufficiently well to lure the particular quarry involved. The head portion 2 is detachably mounted on the body portion 1 by means of a stud 3 attached at one end to the head portion and fitting in a hole 4 provided in the body portion. It is contemplated that the body portions will be made from plastic foam, and therefore an insert 5 may be used to strengthen the body portion in the region of the hole 4. One end of a cord 6 is attached to the free end of the stud 3, and the other end of the cord is attached to an anchor 7. As shown, the cord is attached to the stud 3 by means of a threaded eye 3a turned into the end of the stud, and to the anchor 7 by means of a hole or eye 7a provided on the anchor. Preferably, the anchor has an enlarged portion incapable of passing through the hole 4, so that the head portion and the body portion are securely interconnected.

In the bottom of the body portion, a pair of recesses 8 and 9 are provided as indicated for one of the twin decoys of FIG. 2. Each recess approximates the contour of a symmetrical half of the head portion 2. A third recess 10 is also provided in the bottom of the body portion; this recess approximates the contour of one half of each of the two abutting anchors 7.

The twin decoy illustrated in FIGS. 2 and 3 is formed from a pair of fully separable animal decoys, each of which is similar to the single decoy shown in FIG. 1. The twin decoy has head portions 2L and 2R, studs 3, cords 6 and anchors 7, which are identical with those of the single decoy and attached in an identical manner. Two body portions 1L and 1R reproduce the animal body and have holes 4 and inserts 5 as in the single decoy.

This twin decoy differs from a pair of single decoys, however, in that the recesses provided in the bottoms of the body portions 1L and 1R are specially oriented. As shown in FIG. 2, the bottoms of the body portions may be placed together at a plane X—X. The bottom of body portion 1L has recesses 8, 9 and 10 therein, which are symmetrical about the plane X—X to recesses 8, 9 and 10 provided in the bottom of body portion 1R. The recesses 8, which are mirror images of each other, together approximate the contour of a head portion 2L or 2R. Similarly, mirror image recesses 9 approximate the contour of a head portion 2L or 2R, and mirror image recesses 10 approximate the contour of a pair of abutting anchors 7.

FIG. 3 shows the twin decoy with body portion 1R lifted off body portion 1L. The head portion 2L partly rests in recess 8 and head portion 2R rests in recess 9. Anchor 7 rest in recess 10. With the recesses oriented as shown in FIG. 3, the body portions 1L and 1R may be mated with two fronts adjoining (as in FIG. 2) or with front and rear adjoining (not shown). Each anchor cord is pared around an edge of its body portion; the cords are easily accommodated in one or more of the recesses, or can be wrapped around the outer portions of the twin decoy, thereby holding the twin decoy secure with the heads retained therein, which prevent laterally sliding separation.

The twin decoy ilustrated in FIGS. 4 and 5 is a modification of that shown in FIGS. 2 and 3. This twin decoy is identical with that previously described, except that it is formed from a pair of fully separable single decoys which have identical, not mirror image, recesses in the body portions 1.1 and 1.2. As shown in FIG. 5, in the bottom of each body portion, the recesses 8.1 and 9.1 are symmetrical about a transverse plane Z—Z, and the recess 10.1 for the anchors is placed so that it is also symmetrical with respect to the plane Z—Z. With the recesses oriented as shown in FIG. 5, the bottoms of the two body portions 1.1, 1.2 can be placed together at a plane Y—Y with the front of one body portion adjoining the rear of the other body portion (FIG. 4), and each pair of facing recesses 8.1 and 9.1 will approximate the contour of a head portion 2, and the facing recesses 10.1 will approximate the contour of a pair of abutting anchors 7.

It is evident that twin decoys according to the invention are very compact. Since the recesses need be only half as deep as the heads, the body portions may be made shallower than the body portions of those decoys which have cavities fully receiving a head portion. Although this saving in bulk accompanies only the use of a twin decoy, it is highly unlikely that fewer than two decoys will be used. It is also evident that these decoys can be carved in conventional manner, but they lend themselves especially well to inexpensive construction; plastic foam may be molded or cut in the proper shape and painted and a stud, cord and anchor supplied. No complicated devices are required to retain the head portions in the body portions when the halves of the twin decoy are mated for transport or storage. Moreover, the twin decoy can be quickly and easily set up in the field. After unwrapping the cords 6, the body portions are separated, and each half of the twin decoy is held aloft. The weight of the anchor 7 pulls the head portion 2 to a position where the stud 3 may be easily inserted in the hole 4. Nothing further need be done to assemble the decoy.

I claim:

1. A pair of animal decoys each constituting one fully separable half of a twin decoy and comprising:
   a pair of similar animal heads;
   a pair of similar animal bodies, each body having two recesses in the bottom thereof approximating the contour of said heads and each recess being shallower than the thickness of the heads;
   means removably mounting said heads on said bodies; and
   whereby the heads of the decoys can be partly placed into corresponding recesses of respective bodies for transport or storage with the recesses facing each other and retaining the heads.

2. Decoys according to claim 1, wherein said corresponding recesses in the respective bodies constitute mirror images of each other.

3. Decoys according to claim 1, wherein said heads and bodies simulate an aquatic bird, wherein said bodies have flat bottoms for said recesses, and wherein corresponding recesses completely confine respective heads with the respective bottoms contacting each other.

References Cited

UNITED STATES PATENTS

| | | | |
|---|---|---|---|
| 403,595 | 5/1889 | Jencks | 43—3 |
| 410,523 | 9/1889 | Jencks | 43—3 |
| 841,429 | 1/1907 | Passage | 43—42.35 X |
| 1,157,627 | 10/1915 | Koyen et al. | 43—3 |
| 1,486,329 | 3/1924 | George | 43—3 |
| 1,923,442 | 8/1933 | Kilgore | 43—3 |
| 2,149,054 | 2/1939 | Jones | 43—42.22 |
| 2,430,645 | 11/1947 | Mills et al. | 43—3 |

WARNER H. CAMP, *Primary Examiner.*